(12) United States Patent
Reul

(10) Patent No.: US 10,594,413 B2
(45) Date of Patent: Mar. 17, 2020

(54) HOUSEHOLD APPLIANCE, HOUSEHOLD APPLIANCE ARRANGEMENT AND COOKING SYSTEM

(71) Applicant: Electrolux Appliances Aktiebolag, Stockholm (SE)

(72) Inventor: Kurt Reul, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 357 days.

(21) Appl. No.: 15/522,875

(22) PCT Filed: Nov. 26, 2015

(86) PCT No.: PCT/EP2015/077737
§ 371 (c)(1),
(2) Date: Apr. 28, 2017

(87) PCT Pub. No.: WO2016/087299
PCT Pub. Date: Jun. 9, 2016

(65) Prior Publication Data
US 2017/0324487 A1    Nov. 9, 2017

(30) Foreign Application Priority Data
Dec. 3, 2014    (EP) .................................... 14195990

(51) Int. Cl.
*H05B 6/12* (2006.01)
*H05B 6/06* (2006.01)
(Continued)

(52) U.S. Cl.
CPC ............... *H04B 17/23* (2015.01); *F24C 7/08* (2013.01); *G01K 1/024* (2013.01); *H01Q 1/007* (2013.01);
(Continued)

(58) Field of Classification Search
CPC ...... F24C 7/08; G01K 1/024; G01K 2207/06; H01Q 1/007; H01Q 1/22; H01Q 9/0421;
(Continued)

(56) References Cited

U.S. PATENT DOCUMENTS 6,804,496 B1 * 10/2004 Carlson ................ H04B 1/1027
455/501

FOREIGN PATENT DOCUMENTS

CN    202253825 U    5/2012
CN    103765677 A    4/2014
(Continued)

OTHER PUBLICATIONS

Translation JP 5326834 B2, An Induction cooking device, Dialog ProQuest Document—Jun. 11, 2019(1) (Year: 2013).*
(Continued)

*Primary Examiner* — Quang T Van
(74) *Attorney, Agent, or Firm* — Pearne & Gordon LLP

(57) ABSTRACT

A wireless communication used in a kitchen environment can be supervised and improved as a consequence of the supervision and indication. A sensor device (350) that communicates with a household appliance e.g. a kitchen hob (300) via a wireless communication line (360) can be used for automated cooking processes, and the kitchen hob (100) includes an indicator (480) to indicate the received signal strength of a wireless signal. A receiver (485) can be used to generate signal strength information for the indicator (480). A user is readily informed and can take corrective measures, once no proper wireless signal is available. Also, a feedback to a user can be given at the sensor device (350) by light or vibrating signals in order to take corrective measures.

19 Claims, 5 Drawing Sheets

(51) Int. Cl.
- H04B 17/23 (2015.01)
- G01K 1/02 (2006.01)
- H01Q 9/04 (2006.01)
- F24C 7/08 (2006.01)
- H01Q 1/00 (2006.01)
- H01Q 1/22 (2006.01)
- H04L 29/08 (2006.01)
- H04B 17/318 (2015.01)

(52) U.S. Cl.
CPC ............ *H01Q 1/22* (2013.01); *H01Q 9/045* (2013.01); *H01Q 9/0421* (2013.01); *H04B 17/318* (2015.01); *H04L 67/12* (2013.01); *H05B 6/062* (2013.01); *H05B 6/1209* (2013.01); *G01K 2207/06* (2013.01)

(58) Field of Classification Search
CPC ...... H01Q 9/045; H05B 6/1209; H05B 6/062; H04L 67/12; H04B 17/23; H04B 17/318
USPC ....... 219/620, 621, 622, 624, 626, 627, 647, 219/600, 649, 663, 665, 672, 497; 99/331, 451, 325, DIG. 14; 340/539.27, 340/572.1, 825.36, 825.37, 825.54, 13.37; 220/573.1

See application file for complete search history.

(56) References Cited

FOREIGN PATENT DOCUMENTS

| | | | |
|---|---|---|---|
| DE | 20003307 | U1 | 4/2000 |
| EP | 0619568 | A1 | 10/1994 |
| JP | 5326834 | B2 * | 10/2013 |
| KR | 20070080934 | A | 8/2007 |
| WO | 2013031518 | A1 | 3/2013 |
| WO | 2013098628 | A2 | 7/2013 |

OTHER PUBLICATIONS

Chinese Office action (translation) issued in corresponding Chinese Paten Application No. 201580060691.7 dated Aug. 3, 2018, 13 pages.

International Search Report and Written Opinion issued in corresponding PCT application No. PCT/EP2015/077737 dated Feb. 16, 2016, 10 pages.

* cited by examiner

HOUSEHOLD APPLIANCE, HOUSEHOLD APPLIANCE ARRANGEMENT AND COOKING SYSTEM

In the course of constant automation, wireless technologies also make more and more inroads into home environments. In particular, in kitchen environments, automated cooking programs become more and more sophisticated which also requires a more sophisticated sensor technology to keep track of the cooking process and to control cooking parameters. In an environment where induction hobs are used, cables may be unsuitable as they might absorb induced energy and heat up. On the other hand, high-frequency electromagnetic waves emanated by heating zones of an induction hob may disturb wireless communication. Thus, there is a need for a solution that allows correct wireless communication, while at the same time being reliable and supervisable by an operator.

The document DE 102012210846 A1 discloses an operating device for a household appliance. An operating device is inductively coupled to a supply unit, and the operating unit may communicate an induction power level to the supply unit in order to control the power supply to the operating unit. To summarize a feed-back control between an operating unit and a supply unit for inductive energy is disclosed.

No other related prior art is known.

The invention is based on the problem to improve the reliability of a household appliance e.g. kitchen hob, in particular in the case when a wireless sensor is used to control the progress respectively parameters of the cooking process.

Advantageously, the household appliance e.g. kitchen hob according to the present invention incorporates a technically simple solution to control the proper operation of the hob and the availability of sensor information at the hob. Beneficially, the solution according to the present invention requires no additional parts and only modifications to existing parts. It is thus reliable, not more complicated to manufacture than existing solutions, while at the same time providing better information and control of the cooking process.

Beneficially, according to a further development of an embodiment of the household appliance e.g. kitchen hob according to the present invention, an amplifier in the receiver is used that provides an amplification factor as a value for signal strength information. Thus, information required in the process of proper conditioning of the received signal is made available for further use, and no additional measurements need to be taken respectively sensors be provided.

Beneficially, according to a further development of an embodiment of the household appliance e.g. kitchen hob according to the present invention, an electronic circuit respectively a controller e.g. is present that is adapted to process the signal strength information to generate an indication signal. In this manner, a component that is already present in advanced kitchen hobs to control cooking functions and automated cooking programs is made available for further use to provide additional benefits to the customer and the operator of the oven in providing additional information to safeguard the proper operation of the cooking process.

Advantageously, according to a further development of an embodiment of the household appliance e.g. kitchen hob according to the present invention, the indicator is constructed as a display. In this manner, visible information can be provided to supervise the proper operation of the kitchen hob and the wirelessly attached sensor unit.

Beneficially, according to a further development of an embodiment of the household appliance e.g. kitchen hob according to the present invention, a dedicated antenna is provided with specific geometric properties, because such an antenna is particularly suitable for reliable use in a kitchen environment, and beneficially such an antenna can be technically simple manufactured from a sheet metal and thus imposes no high additional costs on the kitchen hob.

Advantageously, according to a further development of an embodiment of the household appliance e.g. kitchen hob according to the present invention, the antenna is operating in frequency ranges of the ISM band—Industrial Scientific and Medical band, e.g. 433.05 to 434.79 MHz, 902 to 928 MHz, 2.4 to 2.5 GHz. Other frequencies are also conceivable. In this frequency range, reliable wireless communication is possible, in particular considering operation at an induction hob.

Advantageously, according to a further development of an embodiment of the household appliance e.g. kitchen hob according to the present invention, various indications are gradually implementable, such as a hand meter, a bar display or a digit display.

Advantageously, the household appliance e.g. kitchen hob according to an embodiment of the present invention is an induction hob and/or comprises a Superhet-receiver. In this manner, a modern cooking technology can be combined with a reliable receiver that at the same time allows to readily provide an amplification factor as a signal strength information. An oven, a dishwasher, a fridge, a washing machine or a tumble dryer may also be considered as household appliance in this context.

Advantageously, a household appliance—e.g. cooking arrangement according to the present invention comprises a kitchen hob according to the present invention and a sensor device coupled via a wireless communication line. In this manner, the proper operation of the sensor device can be supervised and thus reliability of the cooking process overall be improved, while at the same time safeguarding the proper operation of automated cooking programs that may use the sensor information provided by the sensor device.

Beneficially, according to a further development of an embodiment of the household appliance—e.g. cooking arrangement according to the present invention, the sensor device is a temperature and/or flavor sensor. In this manner, beneficially, the control of a cooking process and the automated preparation of special meals can be improved and better cooking results as a consequence of the improved reliability can be provided.

Advantageously, according to a further development of an embodiment of the household appliance—e.g. cooking arrangement according to the present invention, the sensor device comprises a receiver for inductive energy, as in this manner, no separate power supply is required, in particular an accumulator, when an induction hob is used for cooking.

Advantageously, according to a further development of an embodiment of the household appliance—e.g. cooking arrangement according to the present invention, the sensor device itself also comprises an indicator for indicating the proper operation of the wireless communication line. In this manner, e.g. when the operator stirs the food, or uses a pot, he may be directly informed about the condition of the communication, e.g. a green light emitting diode may be provided or a vibrating actuator may be used that alerts the user to check for further information or control the proper positioning of the sensor device on the hob.

Advantageously, a cooking system according to the present invention provides a simple solution to inform a user of the proper operation of the wireless communication line between a kitchen hob and a sensor device. In this manner, it is relatively simple to implement and to manufacture, while at the same time the effort to adapt present kitchen hobs is limited.

Beneficially, according to a further development of an embodiment of the cooking system according to the present invention, the sensor device allows to indicate the presence of a weak wireless communication as well thereby being capable to immediately alert a user to check all the cooking parameters.

Subsequently, the invention will be further explained on the basis of examples shown in drawings, wherein.

Figure 1:
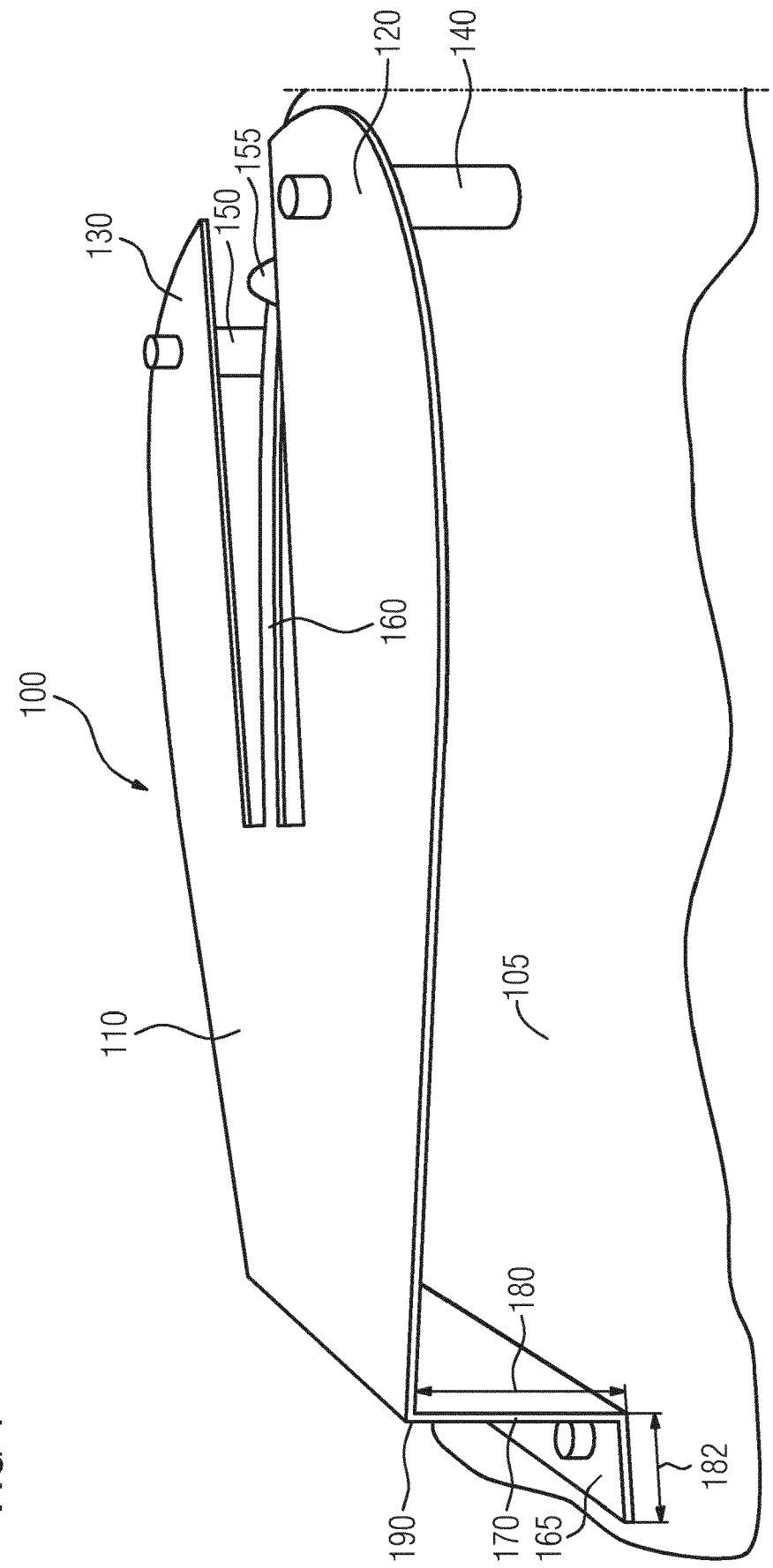
FIG. 1 shows a side view of an antenna.

As shown in FIG. 1, an antenna arrangement 100 that may beneficially form part of embodiments of the present invention comprises a shape part consisting of the left shape 130 and the right shape 120. At its widest part, here the antenna arrangement 100 measures preferably about 100 mm, more preferably 102 mm and most preferably 101.5 mm.

The shaped parts have a curvature which is more closely shown in the following FIG. 2. The left and the right shaped part 130 and 120 are separated by a slit that comprises a tongue 160, which is connected to a coaxial feeding 155. Preferably the slit has an overall width of about 20 mm, more preferably 24 mm and most preferably 23 mm. The tongue 160 beneficially serves to further adapt the transmission characteristics of the antenna arrangement 100. Therefore in different embodiments of the antenna arrangement 100 the tongue 160 may have different proportions.

In one design with a shorter antenna body the tongue 160 ends inside the slit. The overall length of an antenna body according to this structure is about 160 mm, more preferably 156 mm, and most preferably 158.5 mm. Correspondingly the length of the resonating part is about 145 mm, more preferably 141 mm, and most preferably 143.5 mm. Beneficially the tongue 160 has a length of about 60 mm, more preferably 64 mm, and most preferably 62 mm. Preferably from its exterior end inward the tongue comprises a step reaching downward towards the ground plane 105. Preferably this step is used to attach a connector for the coaxial feeding. Beneficially it goes downward from the level of the tongue 160 about 5 mm, preferably 5.5 mm, has a length of about 8 mm, preferably 8.5 mm and conforms to the width of the tongue 160. On the other hand the length of the tongue of this embodiment without the step is thus about 51.5 mm, more preferably 55.5 mm, and most preferably 53.5 mm. At this location, in between the left 130 and the right 120 shaped parts, the feeding by means of a coaxial cable is beneficially provided here. The left shaped part 130 is beneficially supported by an isolated spacer 150 and the right shaped part 120 is beneficially supported by an isolated spacer 140. The distance between the ground plane 105 and resonating structure is about 14 mm, more preferably 10 mm, and most preferably 12 mm.

In another antenna with a longer antenna body the tongue 160 ends outside the slit. The overall length of an antenna body according to this construction is about 173 mm, more preferably 169 mm, and most preferably 171.5 mm. Correspondingly the length of the resonating part is about 158 mm, more preferably 154 mm, and most preferably 156.5 mm. Beneficially the tongue 160 here has a length of about 86.5 mm, more preferably 90.5 mm, and most preferably 88.5 mm. Preferably from its exterior end inward the tongue comprises a step reaching downward towards the ground plane 105. Preferably this step is used to attach a connector for the coaxial feeding. Beneficially it goes downward from the level of the tongue 160 about 5 mm, preferably 5.5 mm, has a length of about 8 mm, preferably 8.5 mm and conforms to the width of the tongue 160. On the other hand the length of the tongue of this structure without the step is thus about 78 mm, more preferably 82 mm, and most preferably 80 mm.

Further, a trapezoidal shape 110 can be identified which extends from the end of the slit to the step at the rectangular part 170 next to the left end of the antenna arrangement 100. Beneficially in both antenna constructions the trapezoidal shape 110 has a length of about 64.8 mm, more preferably 88.8 mm, and most preferably 66.8 mm.

Also, a ground plane 105 can be identified. Next to the ground plane, there is a ground connecting part 165 and a rectangular part 170. The rectangular part has a height 190 and the ground-connecting part has a width 182.

Beneficially the width 182 is about 13 mm, more preferably 17 mm, and most preferably 15 mm.

Beneficially the height 190 is about 10 mm, more preferably 14 mm, and most preferably 12 mm.

As depicted the trapezoidal shape 110 ends at the bend 190 into the rectangular part 170.

Figure 2:
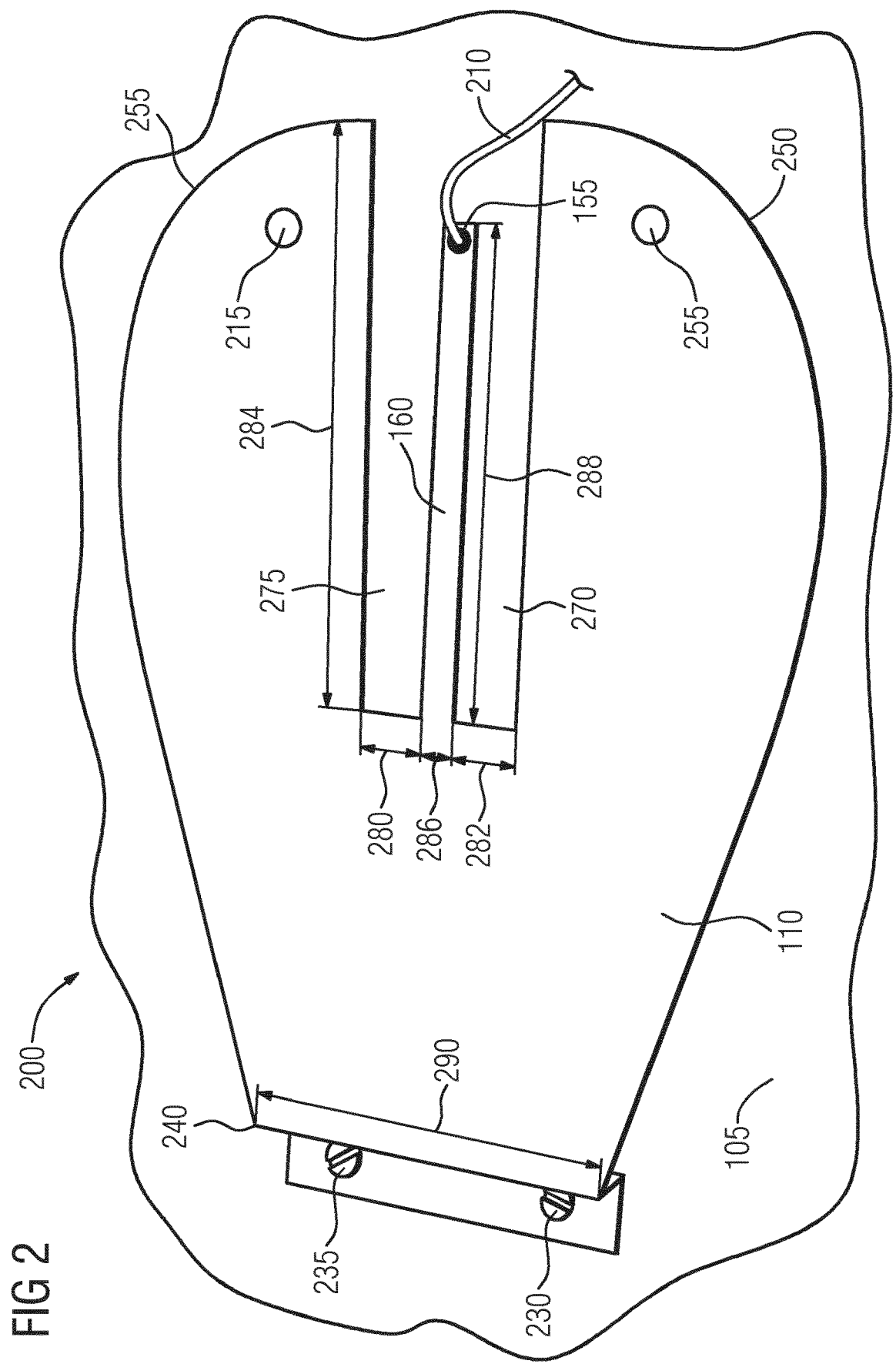
FIG. 2 shows a top view of an antenna.

FIG. 2 shows a top view 200 of an antenna arrangement beneficially forming part in embodiments of the present invention which e.g. substantially resembles a heart shape. Here, also a ground plane 105 can be seen which is underneath the shape part. Further, FIG. 2 depicts top ends of the isolating spacers 225 and 215 respectively mechanically connecting the right shaped part 120 and the left shaped part 130 with the ground plane 105. Furthermore, the left shaped part 130 has a curvature 255 and the right shaped part 120 has a curvature 250. Beneficially, this curvature is implemented as the section of an ellipse. It my conform to a radius of about 48.75 mm, preferably 52.75 mm, most preferably to 50.75 mm. The ellipse provides a good variation regarding the change of the width of a resonating part of the antenna arrangement and thus allows for wideband transmission and reception characteristics.

Moreover, a trapezoidal shape 110 is shown in the drawing. As can be seen, the ground-connecting part 165 is fixed by its screws 230 and 235, respectively, to the ground plane 105. At its left end, the antenna arrangement at the bend 190 has a suitable width 290 in terms of desired transmission-/reception characteristics.

Beneficially the width 290 is about 52 mm, more preferably 56 mm, and most preferably 54 mm.

Favorably the width of the ground connecting part 165 corresponds to the width 290 of the bend. It may be smaller though about 32 mm, more preferably 36 mm, and most preferably 34 mm.

Further, it can be seen that the feeding 155 is provided by a coaxial cable 210 at the tongue 160. The slit of the antenna arrangement can be provided in the form of a left slit 275 and a right slit 270. However, these two slits can be seen as one slit that is separated by the tongue 160 as well. Preferably, the slit has a length 284 about 74.7 mm, more preferably 78.7 mm, and most preferably 76.7 mm in the structure of the shorter antenna arrangement.

Favorably, the slit has a length 284 about 78 mm, more preferably 82 mm, and most preferably 80 mm in the embodiment of the longer antenna arrangement and a width 280, respectively 282, which can be different for the left slit 275 and the right slit 270. Together beneficially the left width 280 plus the right width 282 is about 21 mm, more preferably 25 mm, and most preferably 23 mm. Preferably, the width 286 of the tongue is adapted to the transmission frequencies and measures about 3.8 mm, more preferably 5.8 mm, and most preferably 4.8 mm, Thus generally about 5 mm.

To summarize, the antenna design is technically simple, easy to manufacture and provides wideband characteristics.

A corresponding antenna may preferably be designed for transmission/reception in frequency ranges of the ISM bands—Industrial, Scientific and Medical Band—, e.g. 433.05-434.79 MHz, 902-928 MHz, 2.4-2.5 GHz. Other frequency ranges are also conceivable. In particular frequencies that are commonly associated to Wi-Fi communication or wireless LAN.

Also in terms of its dimension, it can be easily used in combination with a household appliance, especially a kitchen appliance such as a hob to communicate with a sensor that is used in combination with the household appliance, respectively the kitchen hob. The e.g. elliptically tapered resonating metallic plate consisting of the left shaped part 130, the right shaped part 120 and the trapezoidal shaped part 110 allows the increase of the antenna bandwidth of the antenna arrangement and thus permits communication between e.g. a hob and the wireless sensor.

Figure 3:
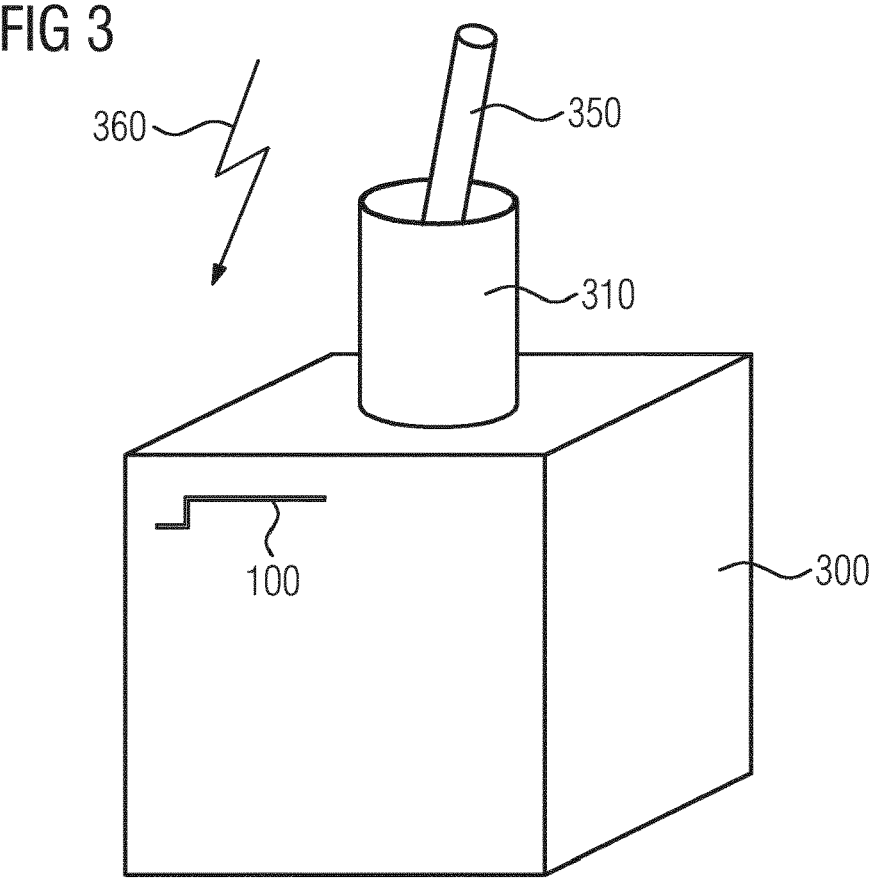
FIG. 3 shows a schematic representation of a kitchen appliance.

As FIG. 3 shows, a kitchen apparatus 300 according to an embodiment of the present invention has an antenna arrangement 100, a cooking vessel 310. Further beneficially it is completed by a cooking sensor 350 that is capable of wirelessly 360 communicating with the antenna arrangement 100. This beneficially provides for a minimum configuration to adapt a sensor application in a kitchen environment and in particular to use sensors to improve cooking results and to control cooking results by an average customer.

Figure 4:
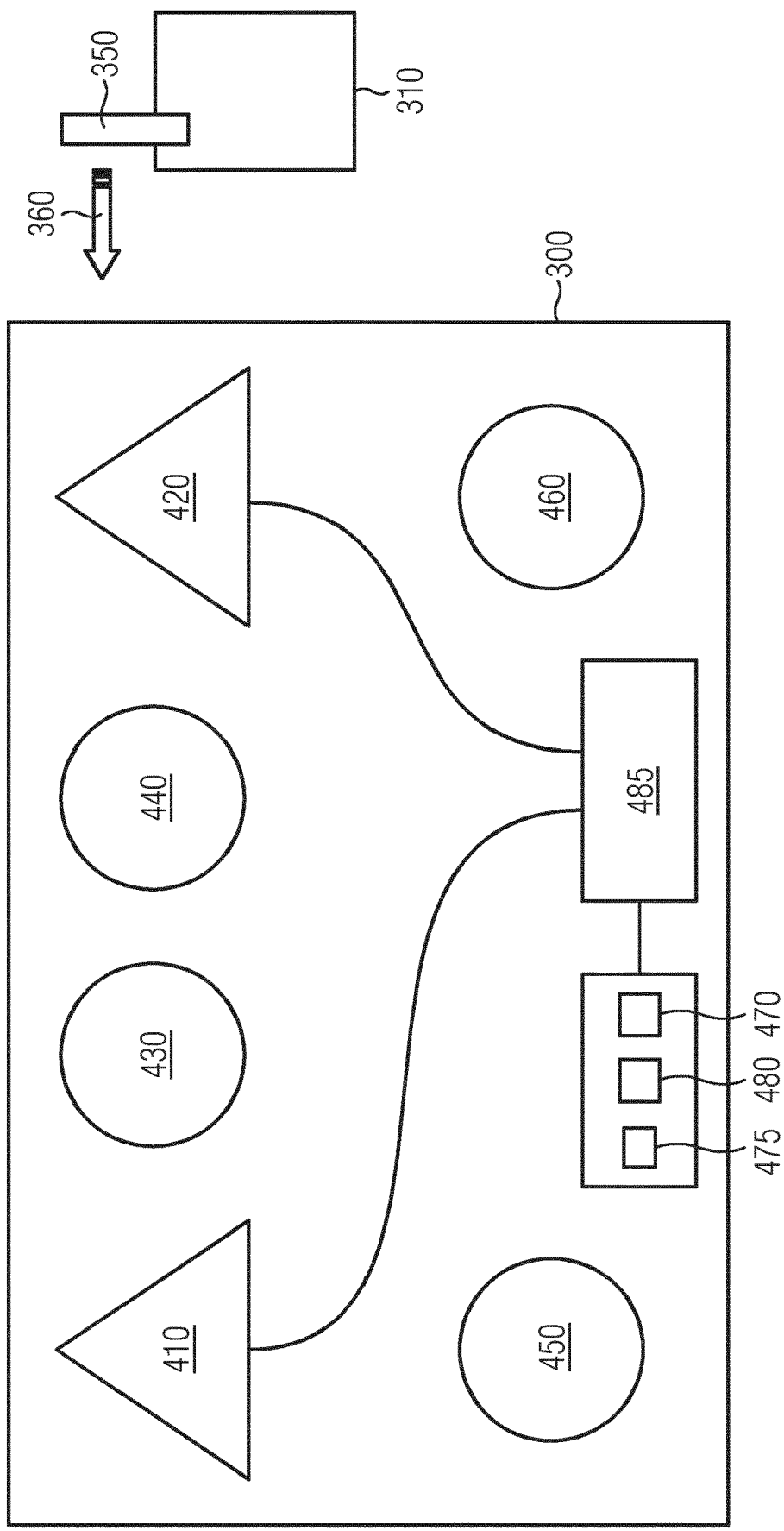
FIG. 4 shows an example of a cooking arrangement.

As FIG. 4 shows, a cooking arrangement according to an embodiment of the present invention 400 beneficially comprises an induction hob 300, a sensor device 350, a cooking pot 310, and a wireless communication line 360. Further, cooking zones in the form of and associated to induction coils 430, 440, 450 and 460 are shown. Also in this case, two antennas 410 and 420 are shown. The antennas preferably operate in the ISM band and may transmit/receive in frequency ranges of this Industrial Scientifical and Medical band defined e.g. from 330.06 to 334.79 MHz, as well as 902 to 928 MHz, while as well as from 2.4 to 2.5 GHz frequency ranges. Other frequencies, of course, are also conceivable. Beneficially the antenna can be also designed to operate in the frequencies of the Wi-Fi band as this is a commonly available technology, widespread and reliable. Thus, implementation of this technology is not overly complicated in a household environment.

In particular, in the presence of an induction coil emanating electromagnetic waves and at induction cooking a condition has to be met that no interference occurs between the electromagnetic waves emanated from the induction coils for the purpose of cooking and the electromagnetic waves used on the wireless communication line 360.

Further, a receiver 485 is comprised, also an indicator 480 is shown, which can also be an acoustical indicator or a simple LED or for instance a meter showing a received signal strength with a hand in form of a bar charge or in form of a seven segment digits display. Also a controller may be present that may beneficially receive signal strength information in form of an amplification sector from the receiver and processes it into a signal strength information that is indicated on the indicator 480.

Also input keys 470 are depicted that allow the input of cooking parameters to control the kitchen hob 300, e.g. to start a particular one of the cooking zones 430 to 460 or to initiate an automated cooking program e.g. by also activating a wireless communication line between the sensor and the kitchen hob in order to supervise certain cooking parameters, such as a temperature, or to receive information about the taste of the food when the sensor is equipped with taste sensors in order to further allow proper spicing of the food to be prepared and control of the result.

The sensor device 350 may be equipped with a coil in order to receive the induction energy emanated from the cooking zones 430-460 and to allow energy supply of the sensor in this manner. On the other hand, the sensor may be equipped with a transmitter/receiver in order to communicate information via the wireless communication line 360, respectively receive control information from the controller 465 of the kitchen hob. In particular, the sensor device 350 may be also equipped with an indicator, such as a light, an acoustic indicator or a vibrating device in order to indicate that an action is required regarding the food to be prepared or in order to indicate that something is wrong with the wireless communication line and to e.g. position the sensor differently in order to improve the wireless communication line.

Using the cooking arrangement according to e.g. a preferred embodiment of the invention allows it to properly supervise the operation of the cooking arrangement in a facilitated manner, while at the same time improving the reliability of automated cooking programs, e.g. supervision of cooking parameters by the kitchen hob, as a failure can be quickly identified and counter-measures be taken by the user with proper effect to ensure correct operation. The receiver 485 may be e.g. operated according to the Superhet principle, e.g. indicates of dynamically amplifying intermediate amplification stages using automated gain control, the amplification factor as a value for the received signal strength on the wireless communication line.

Figure 5:
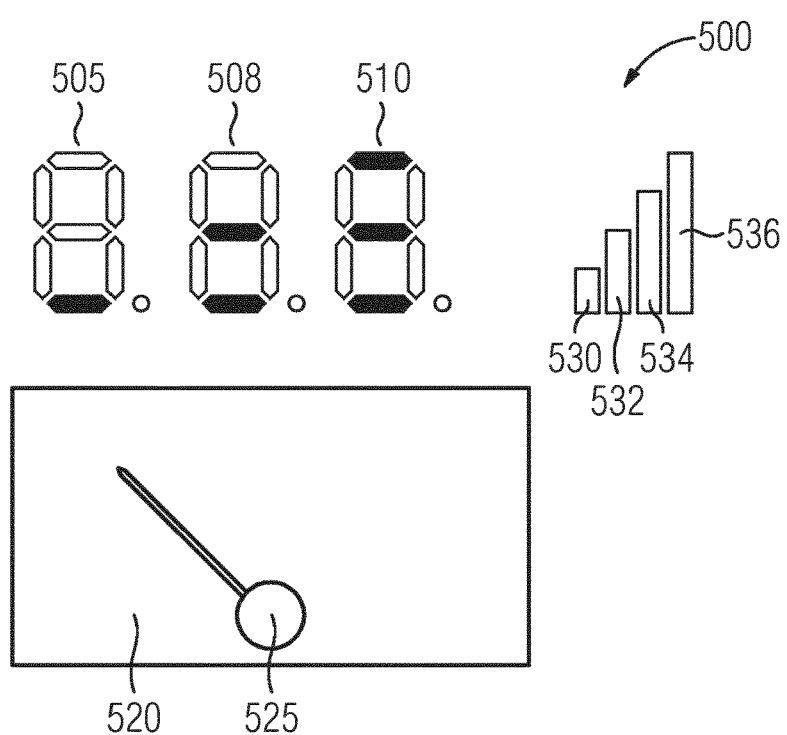
FIG. 5 shows examples of indications for a signal strength information

As FIG. 5 shows, the indication of a received signal strength may be implemented in different forms. Here, several alternatives 500 are shown. For instance, a classic instrument 520 with a hand 525 may indicate the received signal strength. On the other hand, a bar chart indicating the received signal strength of a wireless signal by presenting bars of different lengths may be used. Here, a short bar 530, a longer bar 532, a medium-sized bar 534 and the long bar 536 are shown to indicate a lower or higher received signal strength in the sequence of the recited numbers. On the other hand, also signal strength information may be given in the form of seven segment displays. Thus, e.g. any value between 0 and 100 may be shown depending on the number of segments elements used for displaying the information. Also a percentage indication can be given in terms of maximum received signal strength. Further, other optical or acoustical means can be used in order to inform the user of the kitchen hob of the proper information of the wireless communication line.

Figure 6:
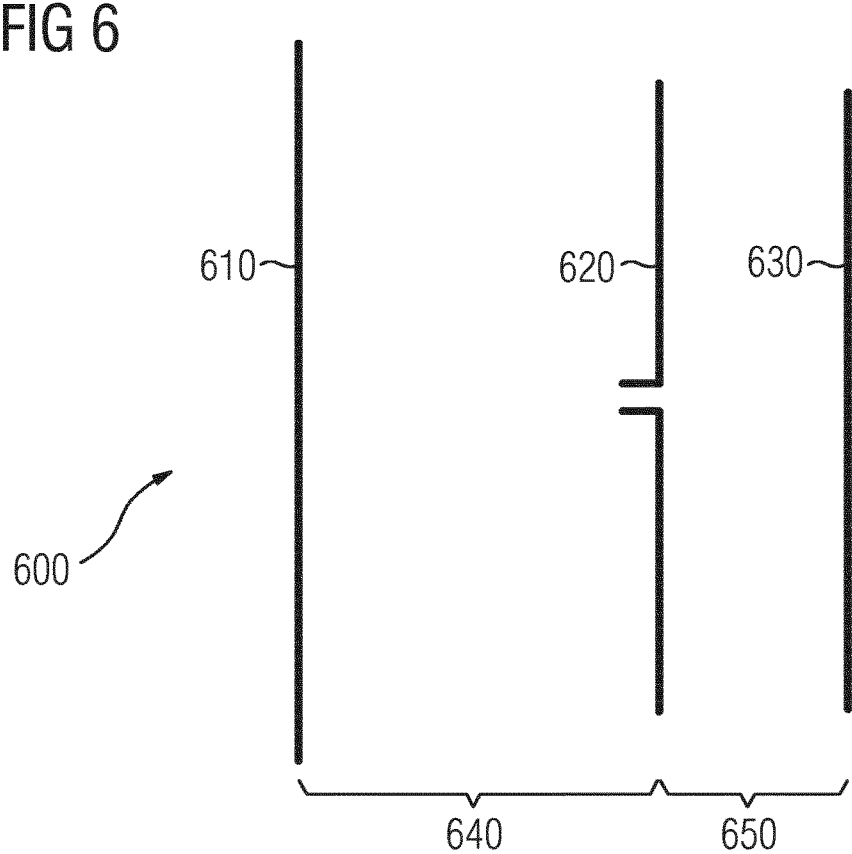
FIG. 6 shows a type of an antenna.

As shown in FIG. 6, an antenna arrangement 600 that may beneficially form part of embodiments of the present invention comprises a director 630, a reflector 610 and a radiator

620 the distances between the parts may be related to the wavelength λ of reception/transmission of the antenna 600. The distance between radiator and reflector 640 may be 0.25λ; and the distance between radiator and director 650 may be 0.13λ. Any other relations are conceivable. In the art such an antenna is also called a Yagi-Uda Antenna.

Figure 7:
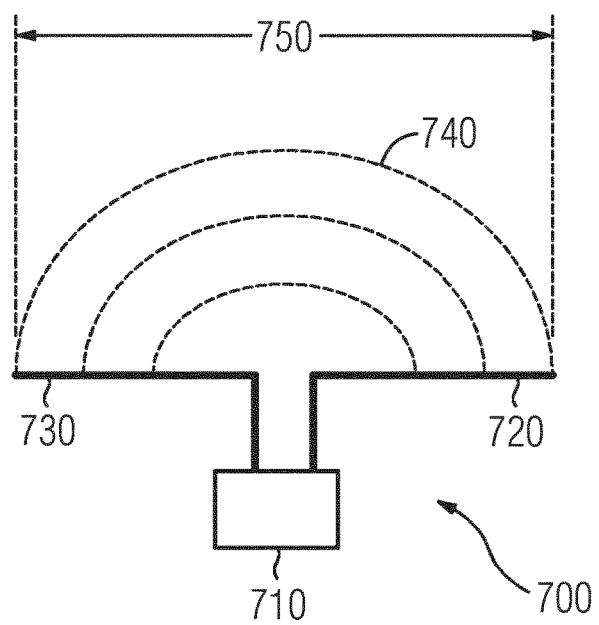
FIG. 7 shows another type of an antenna.

As shown in FIG. 7, another antenna arrangement 700 that may beneficially form part of embodiments of the present invention comprises a transmitter/receiver 710, a left arm 730 and a right arm 720. the length of the arms may be related to the wavelength λ of reception/transmission of the antenna 700. The length 750 of both antenna arms together may for instance amount to a total length of 0.5λ; any other relations to the wavelength are conceivable that suit the characteristics such an antenna design. An electrical field 740 associated to the antenna 700 is further depicted. In the art such an antenna is also called a Dipole Antenna.

From the description above it is clear that without limitations any suitable antenna or combinations of antennas can be used to implement the present invention.

LIST OF REFERENCE NUMERALS

100 side view of antenna arrangement
130 left shaped part
120 right shaped part
155 feeding
150 left isolating spacer
140 right isolating spacer
160 tongue
110 trapezoidal part
165 ground connecting part
170 rectangular part
106 ground plain
200 top view of antenna arrangement
255 left curvature
250 right curvature
215 top of isolating spacer
225 top of isolating spacer
210 coaxial feeding cable
270 right slit
275 left slit
284 length of slit
288 length of tongue
286 width of tongue
280 width of left slit
282 width of right slit
235 screw at ground-connecting part
230 screw at ground-connecting part to connect with ground plane 105
240 left end of shaped part
290 width of left end of shaped part
300 kitchen apparatus
310 cooking vessel
350 sensor
360 wireless communication
410, 420 antenna
430, 440, 450, 460 induction cooking zones
470 input key
480 indicator
485 receiver
475 controller
400 cooking arrangement
500 indicators
505, 508, 510 seven-segment display
520, 525 instrument with hand indicator
530, 532, 534, 536 bar chart indication
600 Yagi Uda Antenna
610 Reflector
620 Radiator
630 Director
640 0.25λ
650 0.13λ
700 Dipole Antenna
710 Transmitter
720, 730 Left and right Antenna arms
740 Electrical Field
750 0.5λ

The invention claimed is:

1. Household appliance arrangement comprising:
a household appliance comprising an antenna, a receiver and a first indicator; and
a wireless sensor configured to transmit a sensor signal indicative of a sensed condition; and
the antenna configured to receive said sensor signal from said wireless sensor via a wireless communication line, said antenna comprising a shape part and a slit, the shape part resembling a heart shape and comprising a trapezoidal-shape section and first and second elliptical-shape sections, the first and second elliptical-shape sections separated by said slit, and a tongue extending in said slit from said trapezoidal-shape section;
said receiver comprising an amplifier adapted to generate signal strength information comprising an amplification factor for said sensor signal, and
said first indicator adapted to indicate said signal strength information.

2. The household appliance arrangement according to claim 1, wherein the receiver is a Superhet-receiver.

3. The household appliance arrangement according to claim 1, comprising a controller that is adapted to process the signal strength information to generate an indication signal.

4. The household appliance arrangement according to claim 1, wherein the first indicator is a display or on an instrument or an indication.

5. The household appliance arrangement according to claim 4, wherein the display is adapted to display an instrument, a segment or a bar or a number.

6. The household appliance arrangement according to claim 1, wherein the antenna comprises:
a ground-connecting part, and
a feed.

7. The household appliance arrangement according to claim 1, wherein the antenna is adapted to operate in the ISM band.

8. The household appliance arrangement according to claim 1, wherein the household appliance is an induction hob, an oven, a dishwasher, a fridge, a washing machine or a tumble dryer.

9. The household appliance arrangement according to claim 1, further comprising:
a sensor device,
wherein the first indicator is adapted to display a signal strength information of a signal received from the sensor device.

10. The household appliance arrangement according to claim 9, wherein the sensor device is one or a combination of the following: a temperature sensor, a taste sensor and a humidity sensor.

11. The household appliance arrangement according to claim 9, wherein the sensor device comprises a receiver for electromagnetic waves for energy supply.

12. The household appliance arrangement according to claim 9, wherein the sensor device comprises a second indicator for a signal condition.

13. The household appliance arrangement according to claim 12, wherein the second indicator is based on movement.

14. A cooking system comprising:
   the household appliance arrangement according to claim 1,
   wherein the wireless sensor wirelessly communicates with a kitchen hob.

15. The cooking system according to claim 14, wherein the wireless sensor indicates a wireless signal condition.

16. The household appliance arrangement of claim 1, said household appliance comprising an induction cooking hob having an induction cooking coil adapted to emit electromagnetic waves to facilitate induction cooking, said sensor comprising a receiver adapted to receive said electromagnetic waves to supply energy for operation of said sensor, wherein said electromagnetic waves will not interfere with the transmission of said sensor signal via said wireless communication line.

17. The household appliance arrangement of claim 1, said wireless sensor having a second indicator adapted to indicate a condition of a wireless communication line between said sensor and said antenna.

18. The household appliance arrangement of claim 17, the antenna configured to receive said sensor signal from said wireless sensor via said wireless communication line in the ISM band.

19. The household appliance arrangement of claim 18, further comprising:
   a controller adapted to process said signal strength information and to generate an indication signal, wherein said signal strength indicated by said first indicator is based on said indication signal.

* * * * *